United States Patent [19]

Fagerburg

[11] 4,045,431

[45] Aug. 30, 1977

[54] FLEXIBLE POLYESTER HAVING A MELTING POINT OF AT LEAST 140° C.

[75] Inventor: David R. Fagerburg, Kingsport, Tenn.

[73] Assignee: Eastman Kodak Company, Rochester, N.Y.

[21] Appl. No.: 639,947

[22] Filed: Dec. 11, 1975

[51] Int. Cl.² .............................................. C08G 63/16
[52] U.S. Cl. ................................ 260/22 D; 426/113; 426/117; 428/458
[58] Field of Search ....................................... 260/22 D

[56] References Cited

U.S. PATENT DOCUMENTS

| 2,901,466 | 8/1959 | Kibler et al. ...................... 260/75 R |
| 3,033,822 | 5/1962 | Kibler et al. ...................... 260/22 D |
| 3,158,584 | 11/1964 | Layman .............................. 260/22 D |
| 3,931,073 | 1/1976 | Jackson et al. .................... 260/22 D |

OTHER PUBLICATIONS

Boylan, Dimerized Acids and Their Use in Coil Coatings, presented at the North Dakota State University Eighth Annual Symposium on New Coatings and New Coatings Raw Materials, May 30, 1966 - pp. 1-26.

*Primary Examiner*—Ronald W. Griffin
*Attorney, Agent, or Firm*—Charles R. Martin; Daniel B. Reece

[57] ABSTRACT

Disclosed is a polyester comprised of 1,4-cyclohexanedimethanol, a major portion of 1,4-cyclohexanedicarboxylic acid and a minor portion of dimer acid. Films of this polyester exhibit an unobvious combination of flexibility and high melting point and are particularly adapted for packaging applications.

2 Claims, No Drawings

FLEXIBLE POLYESTER HAVING A MELTING POINT OF AT LEAST 140° C.

This invention is a polyester which can be formed into films which are quite flexible and have a high melting point. As a consequence of the combination of flexibility and high melting point, these films are particularly useful for packaging applications.

Packaging of consumer products has undergone a drastic change in the last several decades. Prior to the 1950's, many consumer products were either individually packaged in cardboard containers and purchased by the consumer in cardboard containers or products were packaged in bulk with like products and purchased by the consumer without individual packaging. During the 1950's and particularly during the 1960's the availability of plastic packaging materials and suitable packaging technology created a revolution in the packaging industry. During this period of time there was a continual reduction in the number of consumer products packaged in cardboard containers or in bulk and a corresponding increase in the number of consumer products packaged in individual packages partially or wholly constructed from plastic. Typically, the plastic packaging material permitted the product to be viewed by the consumer and created an appealing, visually attractive package. In addition, the plastic packaging material provided the necessary structural requirements for the package, as well as the necessary vapor or liquid barrier requirements for the package. Although many shapes, configurations, and physical forms of plastics have been used for packaging applications, films represent one of the largest uses of plastics for packaging applications.

Because of the widespread use of plastic films in packaging applications, there has developed a need for films having different combinations of properties. For example, films for certain packaging applications are required to exhibit the combination of good flexability and high melting point.

One example of a packaging application requiring a film having a combination of good flexability and high melting point is baby formula pouches. It has been proposed to prepare baby formula in pouches by forming a tube of a film, then thermoplastically sealing the baby formula in a section of the film tube to form a pouch and then sterilizing the pouch. Because the pouch has been sterilized, the pouch would not need to be refrigerated and could be wholesaled, retailed, and stored by the consumer at ambient temperature. Films used in this packaging application would have to be quite flexible in order to be prepared into a pouch which would be flexible enough not to break. Films used in this packaging application would have to have a high melting point because the pouch would be sterilized at 121° C.

Another example of a packaging application which would require a film having a combination of good flexability and high melting point is preparation of precooked food in a so-called "rotortable pouch". The retortable pouch would be constructed of aluminum foil coated with a film. The package would be prepared by forming the aluminum foil around the uncooked food and thermoplastically sealing together the film coated sides of the aluminum foil to form a package for the uncooked food. The package containing the uncooked food would then be cooked and sterilized at 270° F in a retort. Films for this packaging application would have to be flexible so that they could adhere completely to the aluminum foil during coating of the film to the aluminum foil. Films for this packaging application would also have to be flexible so that they would not break when the package is prepared by bending the aluminum foil. Films for this packaging application would have to have a high melting point so that the pouch can be retorted at 270° F.

I have now invented a polyester that can be prepared into films that exhibit a combination of good flexability and a high melting point and are suitable for the above packaging applications.

In broad summary, the polyester of my invention is a polyester of 1,4-cyclohexanedicarboxylic acid and 1,4-cyclohexanedimethanol modified with 10 to 30 mole percent dimer acid.

The prior art application is aware of is U.S. Pat. No. 2,901,466. This patent discloses polyesters of 1,4-cyclohexanedicarboxylic acid, 1,4-cyclohexanedimethanol and a second aliphatic dicarboxylic acid. Several specific aliphatic dicarboxylic acids are disclosed in column 6, lines 58–59, including adipic, sebacic, azelaic, α-ethylsuberic and α, α-diethyladipic acid.

The polyester of this invention is thought to be novel over the disclosure of U.S. Pat. No. 2,901,466 for two reasons. First, the specific type of aliphatic dicarboxylic acid used in the polyester of this invention, called dimer acid, is not disclosed. Second, the specific ranges of 90 to 70 mole percent 1,4-cyclohexanedicarboxylic acid and 10 to 30 mole percent dimer acid used in the polyester of this invention are not disclosed.

The polyester of this invention is thought to be unobvious over the disclosure of U.S. Pat. No. 2,901,466 because the combination of good flexability and high melting point of films prepared from the polyester of this invention is unobvious over the combination of flexability and melting point of films prepared from similar polyesters prepared from 1,4-cyclohexanedicarboxylic acid, 1,4-cyclohexanedimethanol and either 10 to 30 mole percent of the aliphatic dicarboxylic acids disclosed in U.S. Pat. No. 2,901,466 or an amount of the dimer acid that is below 10 mole percent or above 30 mole percent. Thus, the combination of good flexability and high melting point of films prepared from the polyester of this invention results from the combination of a critical range of the specific dimer acid as distinguished from use of another aliphatic dicarboxylic acid than dimer acid used in the same amount as the dimer acid or, alternatively, use of an amount of dimer acid either above or below the critical range.

The use of a critical range of dimer acid is an important aspect of this invention because the amount of dimer acid significantly affects both flexability and melting point. Generally speaking, increasing amounts of dimer acid increases the flexability and decreases the melting point and decreasing amounts of dimer acid decreases the flexability and increases the melting point. Thus, when the amount of dimer acid is below 10 mole percent the melting point is high enough to be acceptable but the film is not sufficiently flexible to be acceptable. When the amount of dimer acid is above 30 mole percent the film is sufficiently flexible to be acceptable but the melting point is unacceptably low. Only when the amount of dimer acid is within 10 to 30 mole percent are films acceptably flexible and have acceptably high melting points.

The use of dimer acid, as opposed to other aliphatic dicarboxylic acids, is an important aspect of this aspect of this invention because use of other aliphatic dicarboxylic acids in the range of 10 to 30 mole percent sometimes produces films with acceptably high melting points but these films are not suitably flexible. For example, most aliphatic dicarboxylic acids, such as those disclosed in U.S. Pat. No. 2,901,466, produce films which can have acceptable melting points if the amount of aliphatic dicarboxylic acid is around 25 to 30 mole percent but these films are not sufficiently flexible to be acceptable.

Thus, in summary, the combination of good flexibility and high melting point of films of the polyester of this invention results from the use of the correct amount of the correct dicarboxylic acid, as opposed to use of the correct amount of an incorrect dicarboxylic acid, which results in films which sometimes have an acceptable melting point but do not have an acceptable stiffness, or the use of an incorrect amount of the correct acid, which results in films which either have unacceptable flexibility and an acceptable melting point or have acceptable flexibility and an unacceptble melting point.

The polyester of my invention can be broadly defined to be comprised of
  A. a dicarboxylic acid component which is
    1. from 90 to 70 mole percent 1,4-cyclohexanedicarboxylic acid having a trans isomer content of at least 80 percent, and
    2. from 10 to 30 mole percent dimer acid, and
  B. 1,4-cyclohexanedimethanol having a trans isomer content of at least 60 percent.

In a preferred embodiment the dicarboxylic acid component is from 85 to 75 mole percent 1,4-cyclohexanedicarboxylic acid and 15 to 25 mole percent dimer acid.

As is well known in the art, the 1,4-cyclohexanedicarboxylic acid useful in this invention can exist as both a trans and cis isomer. In this invention, the 1,4-cyclohexanedicarboxylic acid used to prepare the polyesters of this invention must have a trans isomer content of at least 80 percent, preferably at least 90 percent. If the trans isomer content of the starting dicarboxylic acid is below about 80 percent the time for the polymer to crystallize from the melt tends to become commercially unacceptble. Also the melting point tends to drop to an unacceptable level.

The dimer acid useful in this invention can be described as a 36 carbon atom, long chain aliphatic dicarboxylic acid. The preparation and structure of the dimer acids are described in *Journal of American Oil Chemists Society*, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc., under the tradename Empol Dimer Acid. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

The 1,4-cyclohexanedimethanol used to prepare the polyester of this invention can also exist as a mixture of cis and trans isomers. In this invention the 1,4-cyclohexaneidmethanol has a trans isomer content of at least 60 percent. If the trans isomer content is lower than about 60 percent the time for the polymer to crystallize from the melt tends to become commercially unacceptable. Also the melting point tends to drop to an unacceptable level.

The term "dicarboxylic acid" is meant to include functional equivalents of dicarboxylic acids, such as dialkyl esters.

The polyester of this invention can be prepared by methods for preparing high molecular weight polyester well known in the art, such as direct condensation or ester interchange. Preferably the polyester is prepared by a combination of esterification and ester interchange where the dimethyl ester of 1,4-cyclohexanedicarboxylic acid and the dimer acid component are reacted with the 1,4-cyclohexanedimethanol to form a mixture of the bis ester of 1,4-cyclohexanedicarboxylic acid and the bis ester of the dimer acid and then the mixture of bis esters is polycondensed at high temperature and low pressure to form a high molecular weight polymer through elimination of 1,4-cyclohexanedimethanol.

The polyesters of this invention have an inherent viscosity of at least 0.6, and preferably at least 0.7, measured at 25° C. using 0.23 grams of polymer per 100 ml. of a solvent composed of 60 volumes of phenol and 40 volumes of tetrachloroethane.

As disclosed previously, films of the polyester of this invention are quite flexible. More specifically, films of the polyester of this invention exhibit a flexural modulus of 30,000 psi or less, preferably 15,000 psi or less, when tested in accordance with ASTM D882.

As has also been previously disclosed, films of the polyester of this invention exhibit a high melting point. The films have a melting point of at least 140° C., preferably at least 150° C. when determined in accordance with the Fisher block test. In this test a 10 mil film sample is placed between glass cover slips and the temperature is gradually increased. The melting point is the temperature where the polymer flows under moderate applied pressure.

The polyester of this invention can be prepared into films by techniques well known in the art such as hot rolling or extrusion. Preferably, films are prepared by extrusion using commercial equipment well known in the art. In a typical process pellets of the polyester are melted and conducted through an extruder and extruded in the form of a molten film which is rapidly cooled so that the polyester solidifies and the film is then taken up on rolls.

The polyesters of this invention are useful for preparation of many articles other than films. For example, the polyesters of this invention can be used to prepare tubings and coatings.

The polyesters of this invention can contain a wide variety of materials to modify the properties of the polyester in some particular way. For example, the polyesters can contain a plasticizer, although a plasticizer is not required to achieve the flexibility characteristics of films of the polyester. The polyester can also contain stabilizers, pigments and other materials commonly used in polymers to be used to modify the properties of polyesters. In addition, the polyester can contain an extrusion aid such as pentaerythritol tetrastearate or the bis stearamide of methylenebisaniline.

The following example is presented to illustrate preparation of the polyester of this invention, to illustrate preparation of films of the polyester of this invention, and to document that films of the polyester of this invention exhibit a combination of flexibility and melting point that is unobvious compared to the combination of flexibility and melting point of films of polyesters of the type disclosed in U.S. 2,901,466.

Initially a polyester of the invention is prepared from 80 mole percent 1,4-cyclohexanedicarboxylic acid with 100 percent trans isomer content, 20 mole percent dimer acid, and 1,4-cyclohexanedimethanol.

Into a reaction flask equipped with a stirrer, nitrogen inlet, and outlet for volatile materials produced during the reaction is weighed the following: 80.0 g (0.40 mole) of 1,4-cyclohexanedicarboxylic acid, 100 percent trans isomer, 56.6 g (0.10 mol) of Empol 1010 dimer acid, commercially available from Emery Industries, Inc., 124 g. (0.60 mol, 20% excess) of a 70% solution in methanol of 1,4-cyclohexanedimethanol, 70% trans isomer, and 150 ppm. Ti metal as titanium tetraisopropoxide in n-butanol. The mixture is stirred under nitrogen and immersed in a metal bath held at 200° C. Aftr 15 min. of stirring, the bath temperature is raised to 225° C., held there for approximately 20 min., and raised to 290° C. Upon reaching 290° C., a vacuum is applied to a final pressure of 0.1 torr. The reaction is polycondensed for 3 hr. 15 min. after which time the apparatus is repressurized with nitrogen and the polymer allowed to cool. The inherent viscosity of the polymer is 0.81.

Several other polyesters are prepared in the same manner using amounts of dimer acid beyond the 10 to 30 mole percent that is within the scope of the invention. Also, several other polyesters are prepared using 10 to 30 mole percent of aliphatic dicarboxylic acid similar to those disclosed in U.S. Pat. No. 2,901,466.

Films of all the polyesters are prepared by extrusion of the molten polyester.

The melting point and flexural modulus of all the films are determined in accordance with previously disclosed methods.

Data regarding the amount of dimer acid used, the amount and kind of other aliphatic dicarboxylic acid used and the results of the determination of melting point and flexural modulus are presented in the below table.

TABLE

| Film No. | Dicarboxylic Acid | Mole Percent | Flexural Modulus, psi | Melting Point, ° C. |
|---|---|---|---|---|
| 1 | dimer acid | 20 | 8,000 | 150–160 |
| 2 | dimer acid | 5 | 128,000 | 140–150 |
| 3 | dimer acid | 35 | 4,000 | 135–140 |
| 4 | azelaic | 20 | 69,000 | 150–160 |
| 5 | azelaic | 30 | 59,300 | 135–140 |
| 6 | sebacic | 30 | 36,900 | 150–155 |
| 7 | adipic | 30 | 139,000 | 175–180 |
| 8 | suberic | 30 | 75,200 | 150–155 |
| 9 | dodecanedioic | 20 | 53,000 | 145–150 |
| 10 | dodecanedioic | 30 | 40,000 | 150–155 |

As will be recognized from a consideration of the above Table, Film No. 1 illustrates the invention and Films No. 2 and 3 illustrate the results obtained from using too little and too much dimer acid respectively. As will also be recognized, Films No. 4–10 illustrate the results obtained from using an aliphatic dicarboxylic acid beyond the scope of the invention but within the range of 10 to 30 mole percent.

Considering now Film No. 1, it is to be observed only this film exhibits the combination of a flexural modulus in the range of 30,000 psi or less and a melting point of at least 140° C.

Considering now the result of using an improper amount of dimer acid, Film No. 2 illustrates the use of too little dimer acid and produces a film having a melting point of at least 140° C. but having a flexural modulus above the range of 30,000 psi. Film No. 3 illustrates the use of too much dimer acid and produces a film having a flexural modulus within the range of 30,000 psi or less but a melting point below at least 140° C.

Considering now the result of using from 10 to 30 mole percent of an aliphatic dicarboxylic beyond the scope of the dimer acid of the invention, it will be observed that Films No. 4–10 do not have the combination of a melting point above 140° C. and a flexural modulus within the rang of 30,000 psi or less.

The invention has been described in detal with particular reference to certain preferred embodiments thereof, but it will be understood that variations and modifications can be effected within the spirit and scope of the invention as long as there is preserved the unobvious combination of flexability and melting point of films prepared from the polyester of this invention.

I claim:

1. A polyester having an inherent viscosity of at least 0.6, a flexural modulus of about 30,000 psi or less and a melting point of at least 140° C., the polyester being comprised of
    A. a dicarboxylic acid component which is
        1. from 90 to 70 mole percent 1,4-cyclohexanedicarboxylic acid having a trans isomer content of at least 80 percent, and
        2. from 10 to 30 mole percent dimer acid, and
    B. 1,4-cyclohexanedimethanol having a trans isomer content of at least 60 percent.

2. A polyester having a inherent viscosity of at least 0.7, a flexural modulus of about 30,000 psi or less and a melting point of at least 140° C., the polyester consisting essentially of
    A. a dicarboxylic acid component which is
        1. from 85 to 75 mole percent 1,4-cyclohexanedicarboxylic acid having a trans isomer content of at least 90 percent, and
        2. from 15 to 25 mole percent dimer acid, and
    B. 1,4-cyclohexanedimethanol having a trans isomer content of at least 60 percent.

* * * * *